UNITED STATES PATENT OFFICE.

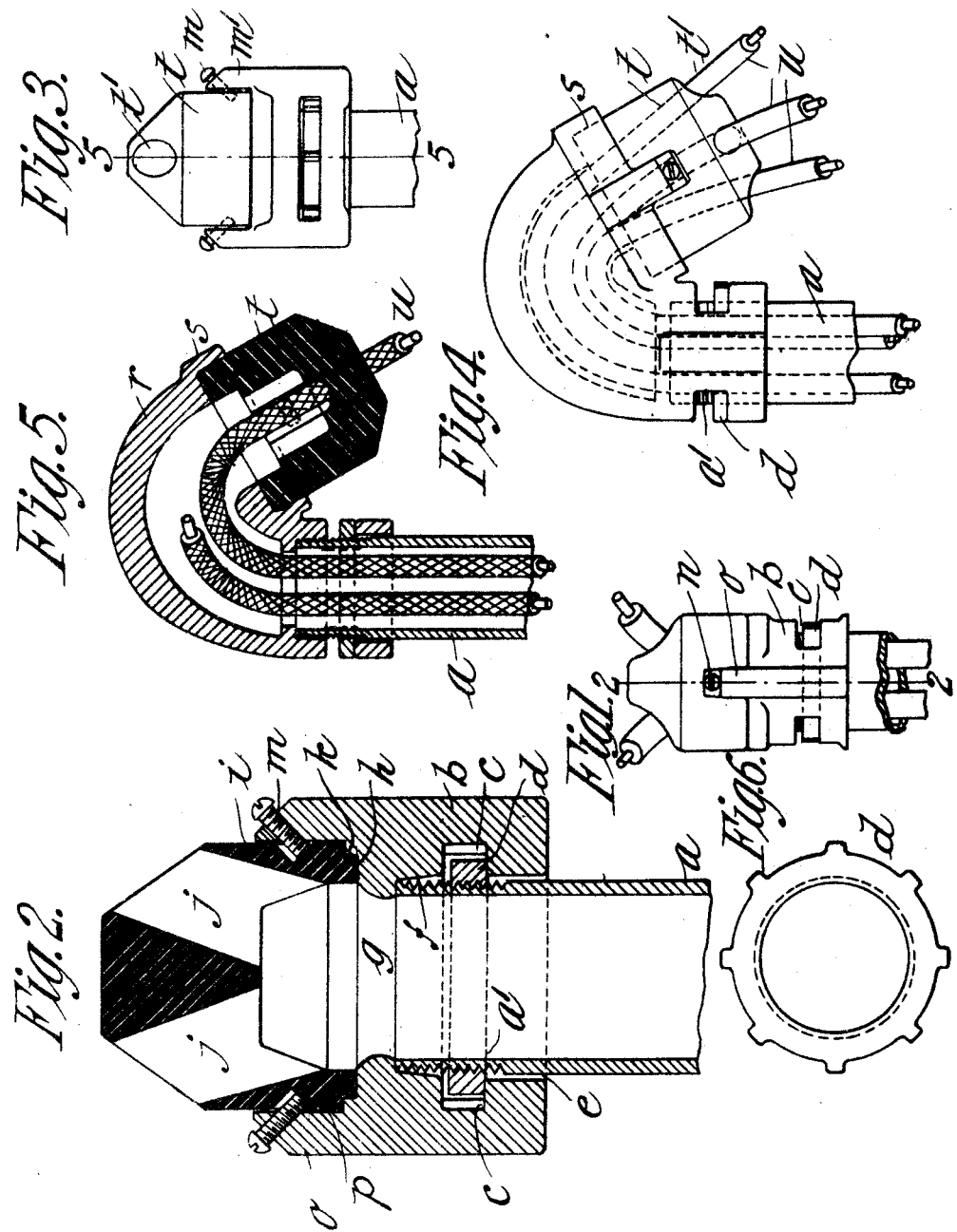

JAMES C. PHELPS, OF SPRINGFIELD, MASSACHUSETTS.

TERMINAL FITTING FOR ELECTRIC CONDUITS.

1,141,484.  Specification of Letters Patent.  Patented June 1, 1915.

Application filed October 23, 1912. Serial No. 727,319.

*To all whom it may concern:*

Be it known that I, JAMES C. PHELPS, a citizen of the United States of America, residing at Springfield, in the county of Hampden and State of Massachusetts, have invented new and useful Improvements in Terminal Fittings for Electric Conduits, of which the following is a specification.

This invention relates to improvements in terminal fittings for electric conduits wherein the wires as they emerge from or enter the end of the conduit are separated a suitable distance from each other so as to prevent a possible short circuit.

Broadly the invention relates to the means employed for securing these fittings onto the end of the conduit or pipe. It is preferable that the terminal fitting employed be composed of suitable insulating material and that it be firmly pressed downward onto the end of the holder member that is attached to the end of the pipe.

An object of the invention relates to the means employed for securing the cap member to the end of the holder member which is attached to the conduit.

The invention is not to be understood as being limited to interior construction work but the fitting may be applied to exterior work as well.

Referring to the drawings forming a part of the specification, Figure 1 is a side elevation showing the parts assembled on the end of a conduit or pipe. Fig. 2 is a vertical sectional view through the axis of the conduit on the line 2—2 of Fig. 1, and clearly illustrating the means employed to attach the fitting to the end of the pipe, which fitting is composed of the cap-holding member that is directly secured to the pipe and the cap or terminal member of insulation that is secured to the holder member; also clearly illustrating the means employed to force the cap member downward against the cap-holding member that is attached to the end of the pipe. Fig. 3 is an external view showing a slight modification in which the invention is applied to exterior construction work. Fig. 4 is a side elevational view of Fig. 3 and illustrating the curved shaped cap holding member that is directly secured to the end of the pipe and the cap member attached thereto and through which the wires pass as they lead into the conduit from the external circuit. Fig. 5 is a vertical sectional view on the line 5—5 of Fig. 3 showing the interior construction of the two members. Fig. 6 is a detailed plan view of the nut element formed with a threaded opening therethrough and by means of which the cap holding member is rigidly secured to the end of the pipe.

Referring to the drawings in detail, $a$ designates the conduit or pipe into which the electric wires are drawn, $b$ a cap holding member that is adapted to be rigidly secured to the end of the pipe and which is formed as a single integral casting in which a transverse opening $c$ is formed to receive the nut $d$ by means of which the holding member $b$ is secured to the end of the pipe $a$, as shown in Fig. 2. The end of the pipe is threaded, as indicated at $a^1$, and is located within the axially arranged recess $e$ of the member $b$, its innermost end portion of which is made inclined or tapered as shown at $f$. Against this tapered portion the end of the pipe $a$ bears when the cap holding member $b$ is assembled. In order to secure the member $b$ to the end of the pipe $a$, it is only necessary to slip the nut $d$ into the opening $c$, and place this member on the end of the pipe, then, by rotating the nut $d$, by means of a suitable implement or tool, as a screw driver, it will be threaded onto the end of the pipe until it brings up against the shoulder or lower edge of the opening $c$ whereby the holder member is rigidly clamped to the end of the pipe and at the same time the inclined surface $f$ will force against and engage the teeth or end of the pipe. The member $b$ is formed with a passageway or opening $g$ therethrough to receive the cables, and, also with a bearing surface $h$ on which the cap member $i$ rests when assembled. This cap member is formed with one or more openings for the wires, as indicated at $j$. The member $b$ is also formed with a circular rib or shoulder $k$ to receive a correspondingly shaped recess in the lower end of the cap, as shown in Fig. 2.

In order to rigidly secure the cap member $i$ to the holder member $b$, a pair of oppositely located set screws $m$ is threaded through the upper ends of the ribs $o$, and, as illustrated in Fig. 2, these screws extend at an angle to the axis of the cap member and engage an inclined bearing surface $l$ that is located in a recess in the side of the cap. This surface is so formed that the end of the set screws $m$ will rest squarely thereon as shown. By arranging the set screws m in an inclined manner it will readily be seen that when they are forcibly rotated against the cap member the same will be moved downwardly against the bearing surface h and firmly seated on and within the rib or shoulder k. It is evident that the tighter the set screws are turned against the cap-member, the firmer will the same be secured to the cap-holder member b. It should be stated that the set screws m are preferably located diametrically opposite each other, and, therefore, the pressure exerted by the set screws acts against the curved surface of the cap member and prevents breaking the same, since the stresses are distributed similar to an arch in bridge construction.

The construction illustrated in Figs. 1 and 2 is preferably designed for interior construction, and the construction shown in Figs. 3, 4 and 5 is preferably designed for exterior construction work and in these figures the pipe a is secured to the curved cap-holding member r in the same manner as already described in connection with Figs. 1 and 2. This curved member, at its outer or lower end, is formed with a collar portion s within which is located the cap or terminal member t. The construction of this cap-member is identical with that shown in Figs. 1 and 2, that is to say, the means employed to secure it in place with the set screws m are located in an inclined manner in the ribs m¹ shown in Fig. 3. The leading in wires, indicated at u and which pass upward through the openings t¹ in the cap t, are those that connect with a transformer or other outdoor fittings. They extend through the cap t, the curved portion r of the cap-holding member that is attached to the pipe, and downward into the pipe a to the interior of the building in the usual manner. This construction is designed to prevent rain and other foreign matter from gaining access to the interior of the pipe. From this construction it will be seen that the present invention is designed to rigidly secure a terminal fitting to the end of the conduit pipe in which there is a very small space between the pipe and the wall and that the nut d will permit the member b to be attached to the end of the pipe by means of any suitable implement or tool which engages the nut, whereby the same may be easily rotated. This construction also permits the cap member to be rigidly secured to the cap-holding member b that is attached to the end of the pipe. From Fig. 1 it will be seen that the external diameters of the members b and i are equal and thus present a neat appearance as well as making the work uniform throughout.

What I claim, is:—

A terminal fitting, comprising in combination, a cap holding member adapted to be secured to a conduit and formed with a shouldered recess, a cap member adapted to lie within, closely fit and bear upon said shouldered recess, said cap member being provided with oppositely disposed inclined recesses in the outer surface thereof, oppositely arranged arms extending upwardly from said cap holding member and adjacent to said cap member, set screws angularly disposed in said arms relative to the axis of said cap, said screws adapted to engage with said inclined recesses in said cap to force and hold the same against said shouldered recess in said cap holding member.

JAMES C. PHELPS.

Witnesses:
K. I. CLEMONS,
HARRY W. BOWEN.